United States Patent
Madsen et al.

(10) Patent No.: US 6,931,180 B2
(45) Date of Patent: Aug. 16, 2005

(54) METHOD AND APPARATUS FOR COMPACTLY COUPLING AN OPTICAL FIBER AND A PLANAR OPTICAL WAVEGUIDE

(75) Inventors: Christi K. Madsen, South Plainfield, NJ (US); Mahmoud Rasras, New Providence, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 10/756,522

(22) Filed: Jan. 13, 2004

(65) Prior Publication Data

US 2005/0152648 A1 Jul. 14, 2005

(51) Int. Cl.[7] .................................. G02B 6/30
(52) U.S. Cl. ...................... 385/49; 385/50; 385/88
(58) Field of Search ................ 385/31, 39, 46–49, 385/50–52, 88, 147

(56) References Cited

U.S. PATENT DOCUMENTS

| | | | |
|---|---|---|---|
| 4,234,969 A | * | 11/1980 | Singh ........................... 398/66 |
| 5,611,014 A | | 3/1997 | Basavanhally |
| 5,710,848 A | * | 1/1998 | Dumais et al. ................ 385/43 |
| 6,003,222 A | | 12/1999 | Barbarossa |
| 6,293,688 B1 | * | 9/2001 | Deacon ....................... 362/556 |

OTHER PUBLICATIONS

Y. Shani, et al. "Efficient Coupling of a Semiconductor Laser to an Optical Fiber by Means of a Tapered Waveguide on Silicon" American Institute of Physics; Sep. 26, 1989; pp. 2389–2391.

A. Hahapatra and J.M. Connors "Thermal Tapering of Ion–Exchanged Channel Guides in Glass" Optical Society of America; Feb. 1988; vol. 13, No. 2; pp. 169–171.

T.L. Koch, et al. "Tapered Waveguide InGaAs/InGaAsP Multiple–Quantum–Well Lasers" Feb. 1990 IEEE; vol. 2, No. 2; pp. 88–90.

Z. Weissman and A. Hardy "Modes of Periodically Segmented Waveguides" Nov. 1993 Journal of Lightwave Technology, vol. 11, No. 11; pp. 1831–1838.

* cited by examiner

Primary Examiner—Akm Enayet Ullah

(57) ABSTRACT

In accordance with the invention, an optical fiber is coupled to a planar waveguide through 1) a series of planar waveguide segments of enlarged cross section and 2) a segment of vertically tapered cross section. The combination of spaced segments and tapered segments provide efficient coupling over a much shorter length than required for conventional adiabatic coupling.

12 Claims, 6 Drawing Sheets

METHOD AND APPARATUS FOR COMPACTLY COUPLING AN OPTICAL FIBER AND A PLANAR OPTICAL WAVEGUIDE

FIELD OF THE INVENTION

This invention relates to a method and apparatus for compactly and efficiently coupling light from an optical fiber into a planar waveguide and vice versa.

BACKGROUND OF THE INVENTION

Planar waveguide devices are important components of optical fiber communication systems. Such systems typically comprise long lengths of fiber for transmission and often use planar waveguide devices to perform a variety of processes such as filtering, multiplexing signal channels, demultiplexing, compensating chromatic dispersion and compensating polarization dispersion.

An optical fiber is typically in the form of a thin strand of glass having a central core of circular cross section peripherally surrounded by concentric cladding glass. The core has a higher refractive index than the cladding so that the light is retained in the core by total internal reflection and propagates in a fiber mode. For long distance transmission the core dimensions are typically chosen so that the light propagates in a single circular mode.

A planar waveguide device, in contrast, is typically formed by thin layers of silica supported by a silicon substrate. The core is typically of rectangular cross section. The core region is formed, as by etching of a masked surface, into a patterned configuration that performs a desired function. In order to permit small radius curves, and thus compact functionality, the difference in refractive index of the planar waveguide core and the index of the cladding is typically substantially greater than the corresponding difference for optical fiber. The planar waveguide is said to be high delta where delta ($\Delta$) is given by the core index less the cladding index, all divided by the core index.

Unfortunately there is a problem in coupling light from the transmission fiber into a planar waveguide. In addition to a mismatch in refractive indices, there is also a mismatch in core size. The core size for a typical optical fiber is significantly larger than the optimal core size for a single mode planar waveguide; therefore, their optical modes don't match because the field is more confined in the waveguide than in the fiber. As a consequence of these mismatches, direct coupling of a fiber to the planar waveguide would incur prohibitive insertion loss of the optical beam.

The conventional approach to this problem is to provide the planar waveguide with an enlarged end for receiving the fiber and to gradually (adiabatically) taper the waveguide core in the lateral direction to optimal size. The lateral taper is on the same plane as the waveguide optical circuit. This approach reduces insertion loss but unfortunately adiabatic lateral tapering is not efficient for high delta waveguides, and it requires substantial length.

A more process-demanding approach is to start with an expanded height waveguide at the fiber end, that is then vertically tapered down to the waveguide circuit level. This technique was proposed by Koch et al. (T. L. Koch, et. al., "*Tapered Waveguide InGaAa/InGaAsP Multiple-Quantum-Well Lasers,*" IEEE Photonics Letters Vol 2. No 2 February 1990; See also A. Mahapatra and J. M. Connors, "*Thermal tapering of ion-exchanged channel guides in glass,*" Opt. Letters, vol. 13, pp. 169–171, 1988, and Shani, et. al., "*Efficient coupling of semiconductor laser to an optical fiber by means of a tapered waveguide on silicon*" Applied physics Letters 55(23), December 1989). However, it requires a substantially large waveguide starting core height which takes a very long time to grow.

A 2-D tapered segmented waveguide was demonstrated by Z. Weissman and A. Hardy. This technique implements two-dimensional mode tapering by introducing gaps between the segments of the waveguides. (Weissman and A. Hardy, "*Modes if Periodically Segmented Waveguide*" IEEE Journal of Lightwave Technology 11: 1831–1838 (1993)). In effect, the total effective index of the guiding area is reduced. This approach is very effective in reducing the coupling loss. However, for high index waveguides, the core thickness is small compared to the fiber, therefore, mode matching via segmented tapes is hard to achieve, and a better matching with the fiber mode can still be achieved.

Accordingly there is a need for an improved arrangement to compactly and efficiently couple light propagating in an optical fiber into a planar waveguide.

SUMMARY OF THE INVENTION

In accordance with the invention, an optical fiber is coupled to a planar waveguide through 1) a series of planar waveguide segments of enlarged cross section and 2) a segment of tapered cross section. The combination of spaced segments and tapered segments provide efficient coupling over a much shorter length than required for conventional adiabatic coupling.

BRIEF DESCRIPTION OF DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION

Figure 1:
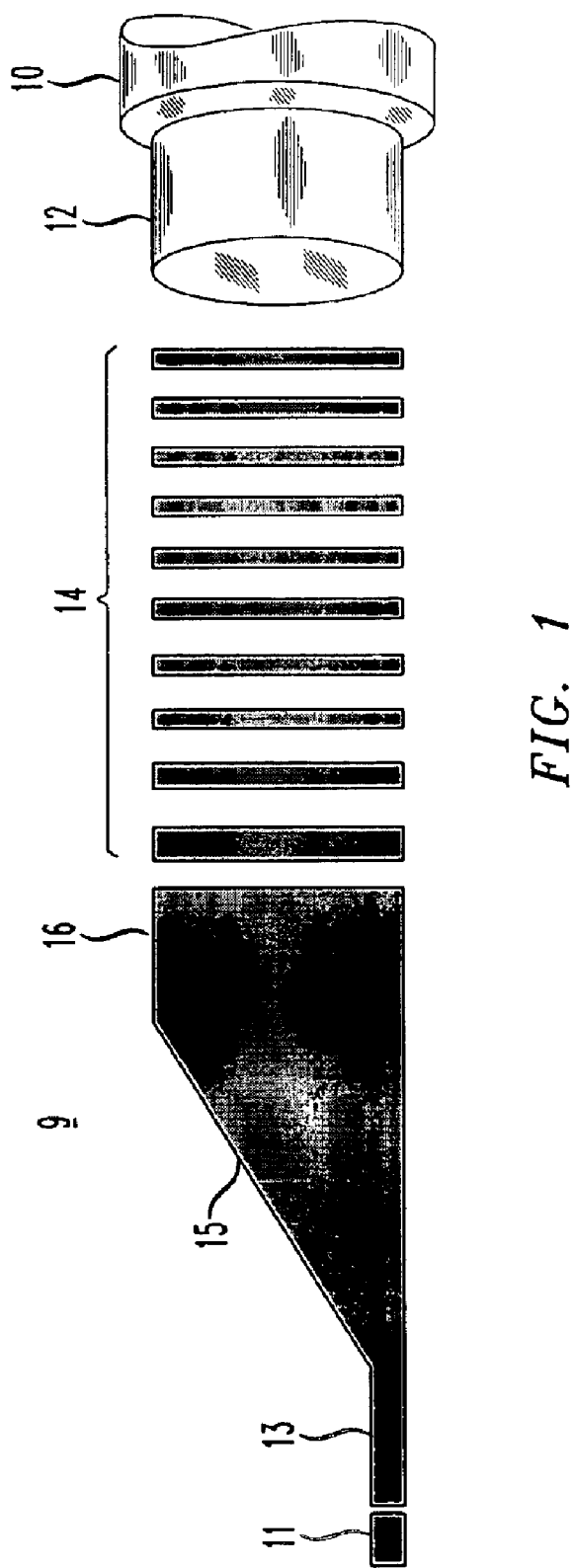
FIG. 1 is a schematic view of an optical fiber coupled to a planar waveguide device in accordance with the invention.

Referring to the drawings, FIG. 1 is a schematic view of a device 9 comprising an optical fiber 10 coupled to a planar waveguide device 11 in accordance with one embodiment of the invention. Specifically, the device 9 includes at least optical fiber 10 having a core 12 of diameter d and at least one axially extending planar waveguide 11 having a core 13 of transverse dimensions (height h and width w) each less than the diameter of the fiber core 12. The fiber core 12 is optically coupled to the smaller waveguide core 13 by a segmented waveguide section 14 of enlarged transverse cross section and a tapered section 15. The segmented section 14 preferably has a transverse cross section approximately the same as the fiber core 12 and provides the initial coupling from the core 12. The thickness of the segments and/or the spacing of the segments varies from the fiber to the planar waveguide so that the light leaving the lower index fiber core fiber encounters a gradually increasing effective core index approximately the higher index planar waveguide core. This permits coupling from segmented section 14 into the enlarged area end 16 of tapered section 15 with minimal index mismatch. The tapered section tapers down to approximate the smaller transverse area of the planar waveguide core 12. The waveguide core 12 is configured, as by geometry, other cores, phase shifters, or ring resonators (not shown) to process the coupled light.

The coupling device of FIG. 1 can be implemented in the form of a segment of optical fiber or as part of an integrated optical device including the planar waveguide.

Similarly, light from a planar waveguide device can be efficiently and compactly coupled out into an optical fiber by passing from the planar waveguide to the fiber. The light would pass in the opposite direction through the tapered section 15 to the enlarged end 16. Then it couples through the segmented section 14 to the lower effective end where it is matched with the end of an optical fiber.

The segmented part of the vertical taper can be fabricated using a standard technique used in silicon optical bench technology. First a lower cladding layer is formed, as by low-pressure steam oxidation followed by an anneal. Then a higher index core layer is deposited, as by Plasma Enhanced vapor deposition (PECVD) or low pressure Chemical vapor deposition (LPCVD), and then it is annealed to flow the glass. Then the segmented waveguide is pattern by photolithography with 1:1 projection using a chrome mask contact. The mask information is then patterned using reactive ion etching through the core. Poly Silicon composition or a hard baked photoresist are used for this process. Gap sizes in the range of 0.7 to 32.5 $\mu$m can be achieved. Next, the cladding layer is deposited in several steps with anneals to flow the glass.

Shadow or dither masks can be used to pattern the vertically tapered portion of the structure. These masks allow for variable transmission of light intensities. Areas where the photoresist is exposed to higher light intensities will be developed faster. The etching speed of the core material is related to the how far the resist is developed, therefore, areas with different heights can be fabricated.

Figure 4:
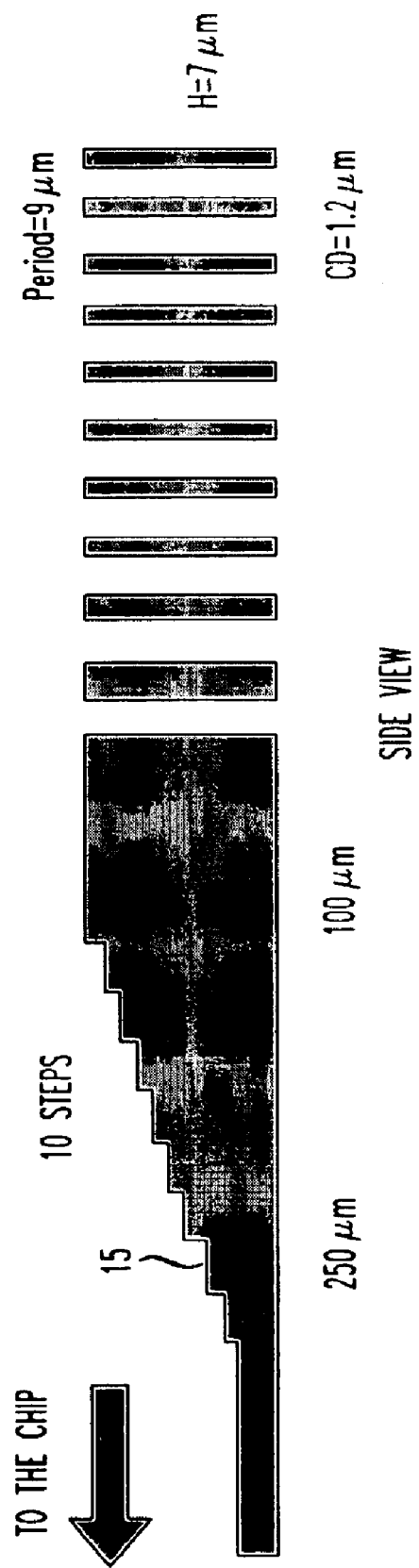
FIG. 4 schematically illustrates an example of a coupling arrangement wherein the tapered region is step-tapered rather than continuously tapered.

In an alternative embodiment, the tapered section 15 can be step-tapered, as shown in FIG. 4, instead of continuously tapered as shown in FIG. 1. The advantage of this approach is ease of fabrication. However, higher order modes can be excited which can lead to increase in loss when small number of steps are used.

Figure 5:
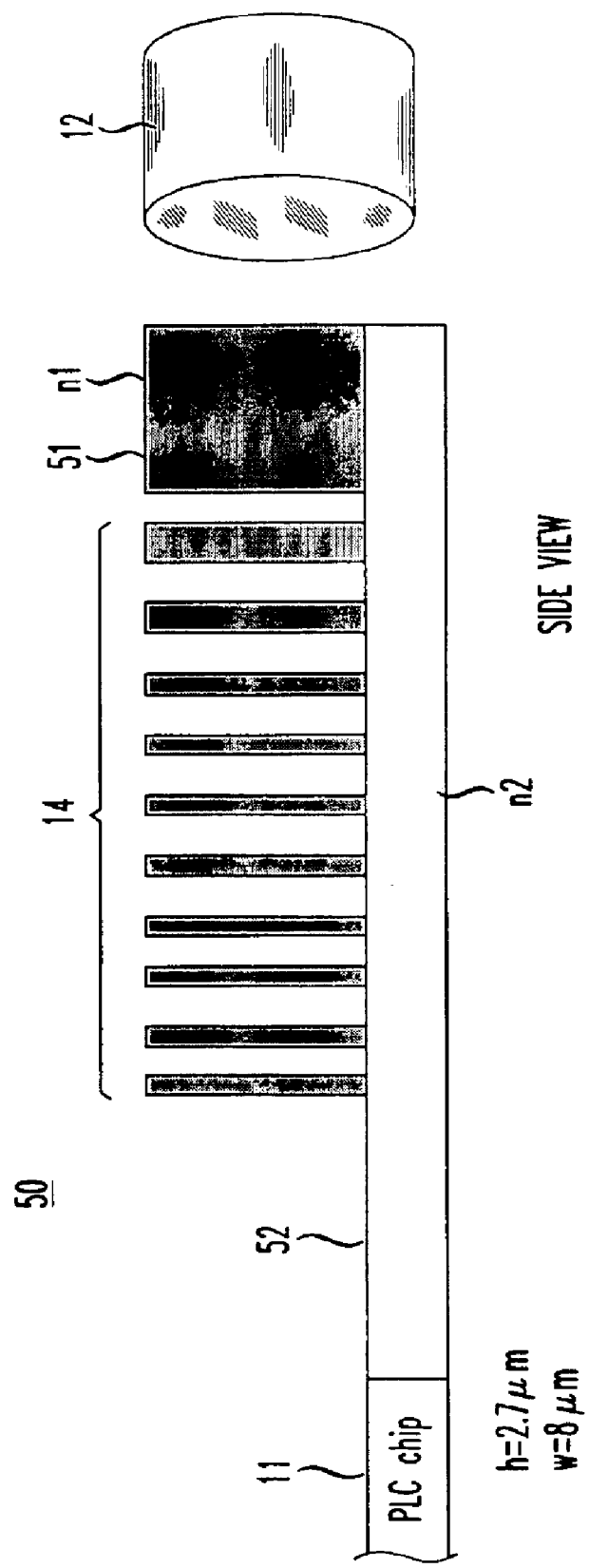
FIG. 5 schematically illustrates an exemplary side view of a coupling arrangement comprising two materials of different indices of refraction wherein segments are situated on a planar guide.

In another alternative embodiment, as shown in FIG. 5, the coupler structure comprises two layers to couple from a fiber to a planar lightwave circuit (PLC) chip. Segments of index of refraction n1 are situated in contact with planer waveguide 52 having index of refraction n2. Core 51 (n1) is a thick low index material that efficiently couples light from the fiber to the coupler chip. Core 52 (n2) is a high index core of the same material as the PLC device. Light can be efficiently coupled to the n1, n2 cores where the low index core is segmented with gaps. The gap size increases towards the PLC chip, therefore the effective index of the low index core is slowly reduced. Consequently, light is adiabatically couple to the high index core. The end width (near the PLC chip) can be tapered down to the single mode size of the waveguide.

Figure 6:
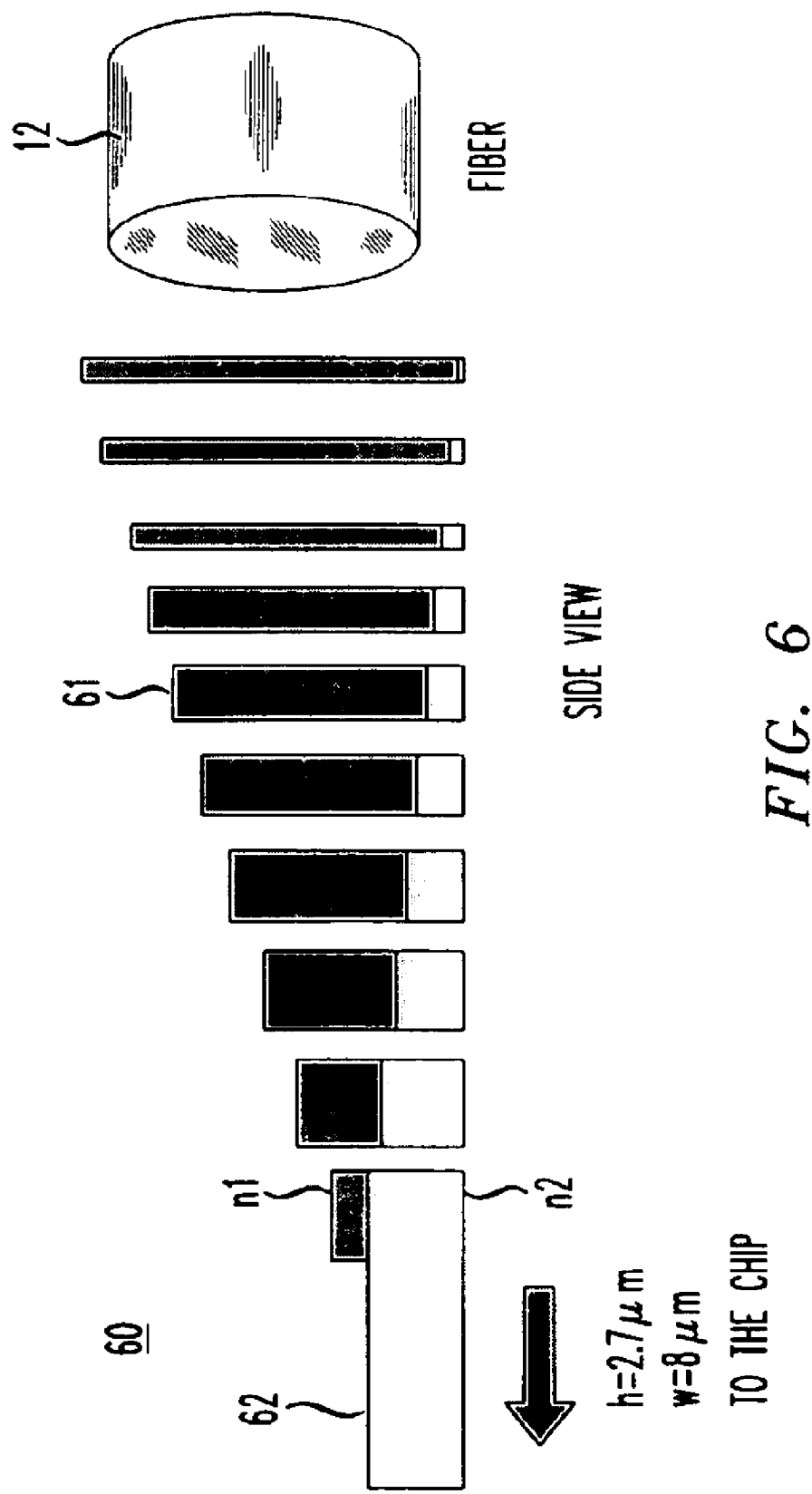
FIG. 6 schematically illustrates an exemplary side view of a coupling arrangement wherein a tapered segmented section comprises two materials of different indices of refraction.

In yet another alternative embodiment, as shown in FIG. 6, variable height segments are tapered from fiber 12 to planar waveguide 62. Segments 61 comprise two materials, one of index of refraction n1 compatible with the fiber and one of index of refraction n2, the index of the planer waveguide. The portion of the segment comprising index n2 is gradually increased until it matches the dimensions of planar waveguide 62.

In the following examples, the dimensions of the segments, and in particular segment thicknesses, were determined by use of Prometheus. Prometheus is a 3D finite difference beam propagation computer program that uses standard techniques for waveguide simulation and device optimization. The Prometheus package (formerly BBV Software, The Netherlands) is now part of "OlympIOs". OlympIOs, a commercially available optics software package, comprises Prometheus, as well as a 2D effective index beam propagation method. (C2V, P.O. Box 318, 7500 AH, Enschede, The Netherlands). The invention can now be more clearly understood by consideration of the following specific examples:

EXAMPLE 1

Figure 2:
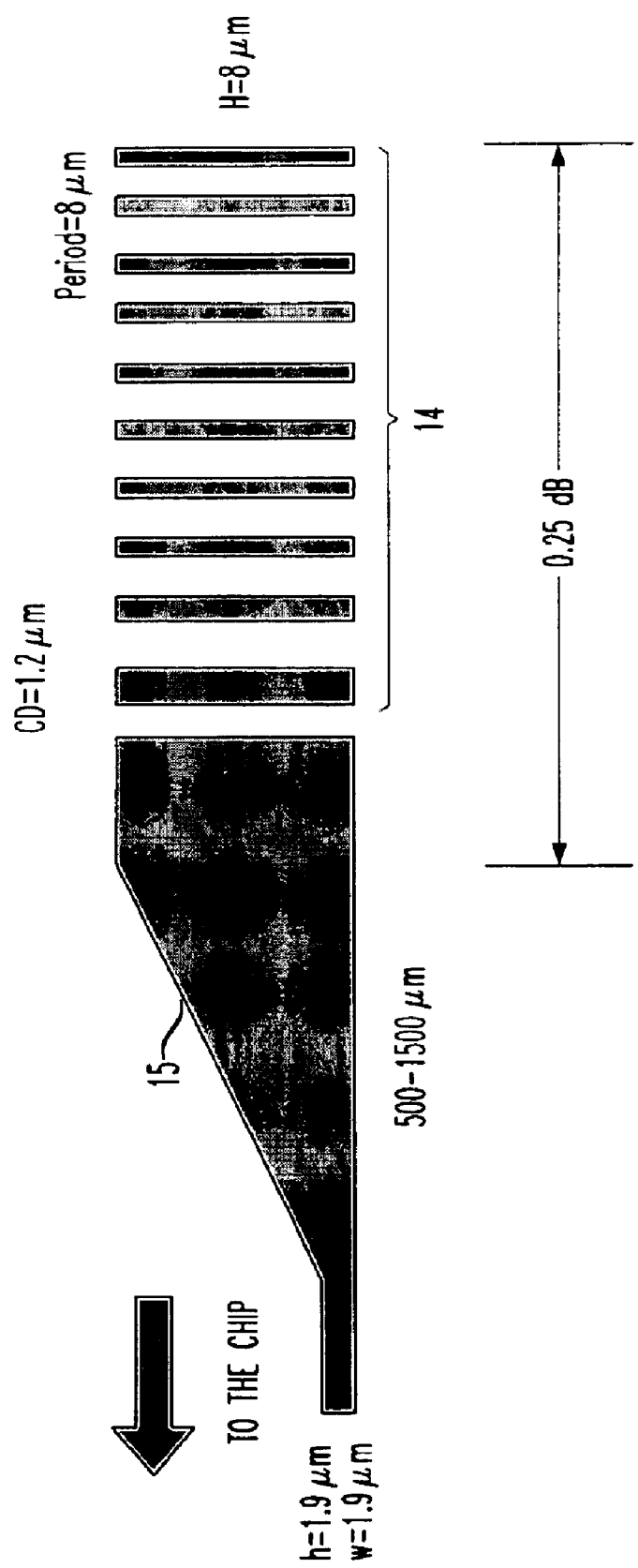
FIG. 2 schematically illustrates a first example of a FIG. 1 coupling arrangement.

FIG. 2 schematically illustrates an arrangement for coupling an optical fiber having an 8 micrometer core with a high 6% delta planar waveguide of dimension 1.9×1.9 micrometers. The segmented section 14 comprises 10 high delta segments coupling from the fiber core to a tapered section 15. Each segment has a cross section of 8×8 micrometers and successive segments are periodically spaced 8 micrometers apart (center-to-center). Successive segments have increasing thickness in the longitudinal direction from the fiber to the tapered section so that light from the fiber experiences an increasing effective index as it approaches the continuous high delta tapered section. The tapered section includes a 110 micrometer length without taper and a 250 micrometer length without taper and a 250 micrometer region of linear taper down to planar waveguide dimension. The coupling loss is about 0.25 dB from input segment to the beginning of the linear taper. The loss in the adiabatic taper depends on the length and shape.

EXAMPLE 2

Figure 3:
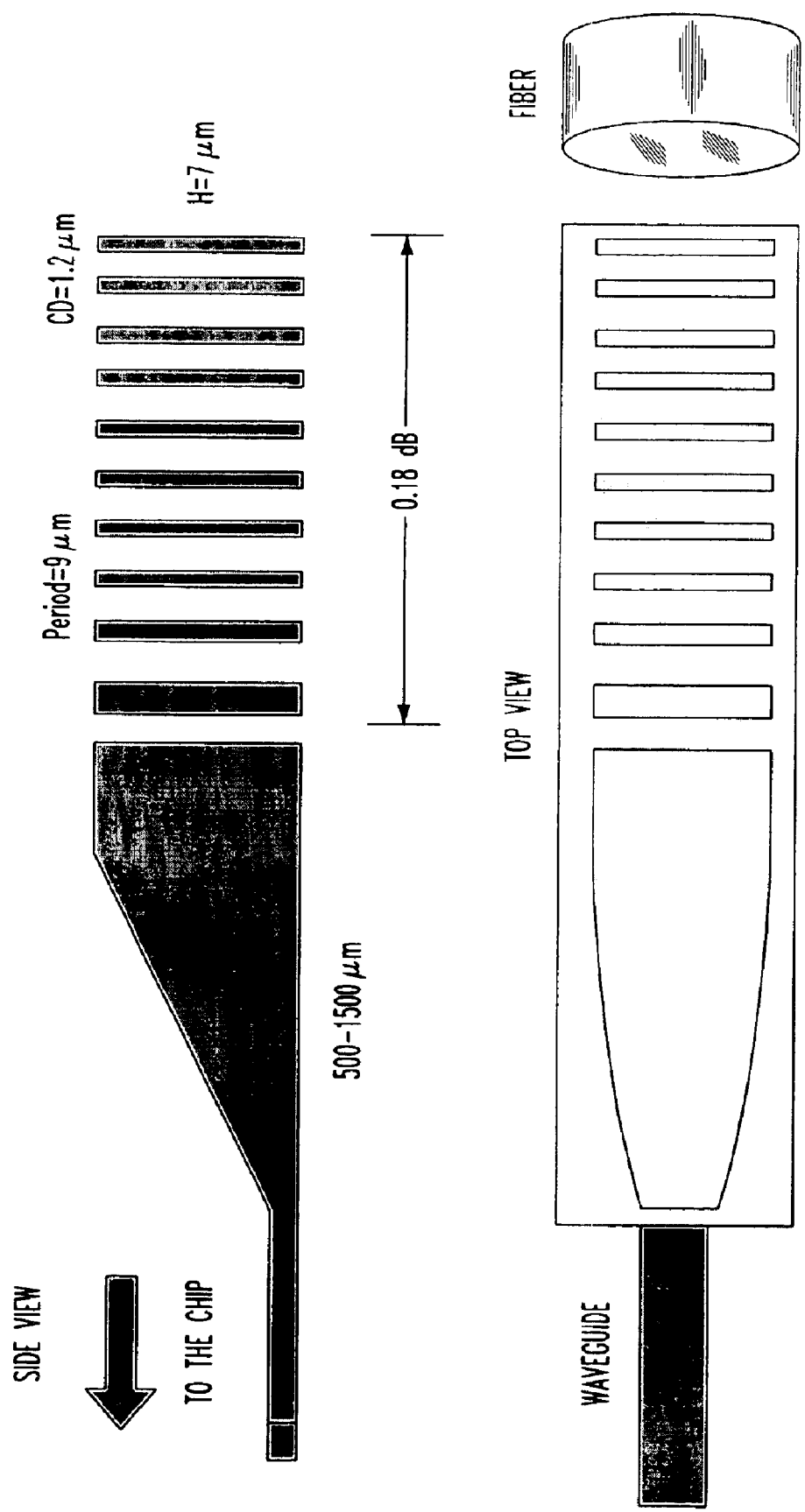
FIG. 3 schematically illustrates a second example of a FIG. 1 coupling arrangement.

For coupling an optical fiber to 4% delta planar waveguide, a similar arrangement shown in FIG. 3 can have 7×7 micrometer segments periodically spaced by 9 micrometers. Total coupling loss is about 0.18 dB.

EXAMPLE 3

FIG. 4 schematically illustrates an arrangement using a tapered section 15 that is step tapered rather than continuously tapered. It uses ten 7×7 micrometer segments to couple from a fiber (not shown) to a step tapered section 15. The section 15 is tapered downward 0.43 micrometers in each of ten 25 micrometer steps. The total coupling loss is about 0.35 dB for coupling to a 4% delta planar waveguide.

It can now be seen that the invention includes a device for optically coupling an optical fiber to a planar waveguide.

The device comprises a waveguiding structure comprising a segmented guiding position and a tapered guiding portion, both guiding portions disposed in a lower refractive index cladding region between the fiber and the planar waveguide.

The segmented guiding portion comprises a series of spaced apart segments of higher refractive index material. The segments have longitudinal cross sections substantially equal to the cross section of the fiber core, and successive segments having increasing axial thicknesses in order to present an effective refractive index that varies from approximating that of the fiber core to approximating that of the planar waveguide.

The tapered guiding portion has a longitudinal cross section that varies from approximating that of the segmented guiding section to approximating that of the planar waveguide core. The taper can be continuous or stepped.

EXAMPLE 4

FIG. 5 schematically illustrates an arrangement using a two layered approach comprising cores 51 and 52. Here, light from fiber core 12 is coupled into a planar waveguide with dimensions of height of 2.7 $\mu$m and a width of 8.0 $\mu$m. It uses ten segments to couple from a fiber through core 51 to core 52. Core 52 has height of 2.7 $\mu$m and a width of 8 $\mu$m.

EXAMPLE 5

FIG. 6 schematically illustrates an arrangement where the segments comprise two materials of n1 and n2 index of refraction where n2>n1. 10 segments 61 are used to couple light from fiber 12 to planar lightwave guide 63. (The number of segments used can vary between 10 to 30 depends on the indices.) Segments 61 have increasing thickness from fiber 12 to the planar waveguide 62. Additionally, segments 61 comprise an increasing portion of the n2 material towards the planar waveguide. At the planar guide, the dimensions of n2 material in the last segment match the dimensions of planar waveguide 62, here 2.7 $\mu$m by 8 $\mu$m.

It is understood that the above-described embodiments are illustrative of only a few of the many possible specific embodiments which can represent applications of the invention. Numerous and varied other arrangements can be made by those skilled in the art without departing from the spirit and scope of the invention.

What is claimed is:

1. A coupling device for optically coupling an optical fiber to a planar waveguide comprising:
   an optical waveguiding structure comprising a segmented guiding portion and a tapered guiding portion, each disposed in a lower refractive index cladding region between the fiber and the planar waveguide;
   the segmented guiding portion comprising a series of spaced apart segments of lower refractive index material, the segments having longitudinal cross sections substantially equal to the cross section of the fiber core and successive segments having increasing axial thicknesses to present to light from the fiber an effective refractive index increasingly approximating that of the planar waveguide as the light approaches the waveguide; and
   the tapered guiding portion having a longitudinal cross section adjacent the segmented guiding portion substantially equal to the adjacent segment longitudinal cross sectional area and, between the segmented guiding portion and then planar waveguide core, a tapered region tapering the cross sectional area to approximate that of the waveguide core at an axial position adjacent the waveguide core.

2. The coupling device of claim 1 wherein the tapered guiding section has a continuously tapered section.

3. The coupling device of claim 1 wherein the tapered guiding section has a step tapered section.

4. The coupling device of claim 1 wherein the fiber core has a larger cross sectional area than the planar waveguide core.

5. The coupling device of claim 4 wherein the fiber core has a lower refractive index than the planar waveguide core.

6. The coupling device of claim 1 wherein the planar waveguide has a high delta core of 4% or greater.

7. The coupling device of claim 1 wherein the planar waveguide has a high delta core of 6% or greater.

8. The coupling device of claim 1 wherein the waveguiding structure is configured in the form of an optical fiber.

9. The coupling device of claim 1 wherein the waveguiding structure is disposed in an integrated optical device including the planar waveguide.

10. An optical fiber coupled to a planar waveguide by the coupling device of claim 1.

11. A coupling device for optically coupling an optical fiber to a planar waveguide comprising:
    an optical waveguiding structure comprising a segmented guiding portion disposed on the planer waveguide, the segmented guiding portion and the planer waveguide having different indices of refraction;
    the segmented guiding portion comprising a series of spaced apart segments of lower refractive index material, the segments having longitudinal cross sections substantially equal to the cross section of the fiber core and successive segments having increasing axial thicknesses to present to light from the fiber an effective refractive index increasingly approximating that of the planar waveguide as the light propagates to the waveguide; and
    the segmented portion having a longitudinal cross section adjacent the waveguide substantially equal to the adjacent waveguide longitudinal cross sectional area and, the segmented guiding portion disposed on the planar waveguide core, to propagate light between the segmented portion and the waveguide core.

12. A coupling device for optically coupling an optical fiber to a planar waveguide comprising:
    an optical waveguiding structure comprising a segmented guiding portion, at least one of the segments comprising at least two materials of differing indices of refraction;
    the segmented guiding portion comprising a series of spaced apart segments, the segments having longitudinal cross sections substantially equal to the cross section of the fiber core and successive segments having increasing axial thicknesses to present to light from the fiber an effective refractive index increasingly approximating that of the planar waveguide as the light propagates between the fiber and the waveguide.

* * * * *